Figures 1, 2:
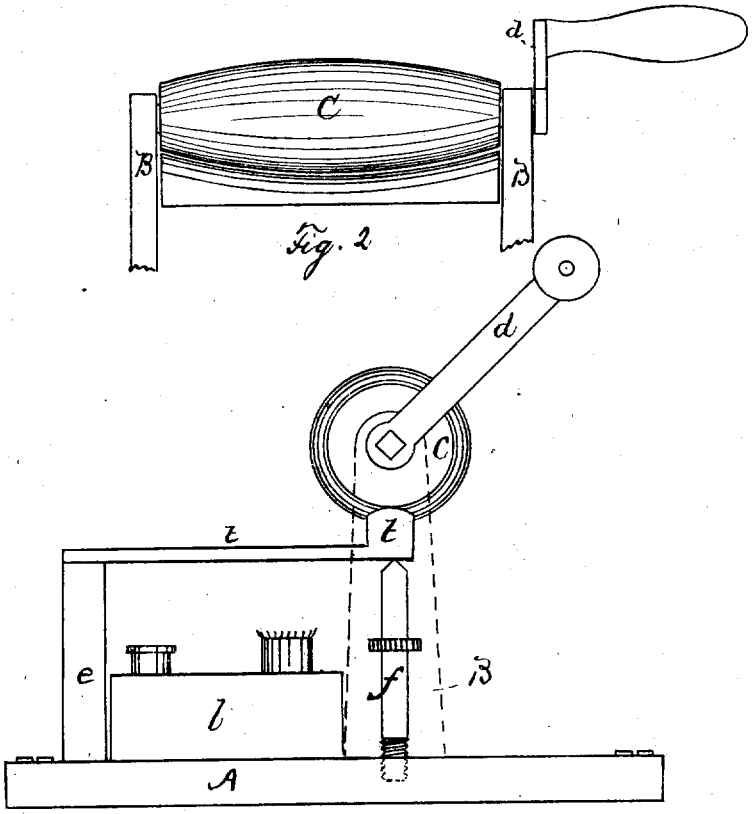

E. R. WESTON.

Improvement in Burnishers for Photographs, &c.

No. 5,281. Reissued Feb. 11, 1873.

Witness
Henry Fuller
John J. Rickter

Inventor
Emile R. Weston
Per Atty Wm. Franklin Seavey

AM. PHOTO-LITHOGRAPHIC CO. N.Y. (OSBORNE'S PROCESS)

UNITED STATES PATENT OFFICE.

EMILE R. WESTON, OF EAST CORINTH, MAINE, ASSIGNOR OF ONE-HALF INTEREST TO TIMOTHY McDONALD.

IMPROVEMENT IN BURNISHERS FOR PHOTOGRAPHS, &c.

Specification forming part of Letters Patent No. 131,319, dated September 10, 1872; reissue No. 5,281, dated February 11, 1873.

*To all whom it may concern:*

Be it known that I, EMILE R. WESTON, of East Corinth, in the county of Penobscot and State of Maine, have invented a certain new and useful Improved Burnisher for Burnishing Photographs, Card-Board, and articles of a kindred nature; and I hereby declare the following to be a full, clear, and exact description thereof, which will enable others to make and use the same, reference being had to the accompanying drawing forming a part of this specification, in which—

Figure 1 shows a side view; Fig. 2, a front view, of roll and burnisher.

Same letters show like parts.

My invention consists of a stationary burnishing-tool of hard polished metal, over which the article to be burnished is fed by a friction feed-roll.

My device effects its purpose by friction under pressure, and is adapted to polishing photographic pictures, card-board, and other articles of similar nature, which are capable of receiving a surface by continuous friction under pressure against the surface of a burnisher. The cylindrical form of the roll gives but a small line of pressure upon the surface of the burnishing-tool, which, being the more highly polished of the two, allows the article to be fed through, polishing it in its passage. The distance between the roll and tool, and consequently the amount of pressure on the article to be burnished, may be regulated by a screw. The application of heat to the tool materially adds to its effect.

The burnishing-tool is composed of metal, as before stated, having a turned edge or projection under the feed-roll. I think cast-iron will be found preferable, with the projection or burnishing-face case-hardened and highly polished.

In the drawing, A shows the base of the machine; B B, standards supporting the feed-roll C; and *d*, a crank, by which it may be rotated. At *e* is a standard for supporting the burnishing-tool; *f*, a pressure-screw for regulating the pressure on the article to be burnished; and *l*, a lamp for supplying heat to the tool.

I do not claim a press consisting of two rollers between which the photograph is passed, as shown in the patent of D. and B. Marshall, granted July 12, 1864; nor do I claim "two rollers" in any form. My device is entirely different, and operates on a different principle. The article to be burnished is not pressed in order to give it a surface, but receives its polish by friction—*i. e.*, by being drawn over the surface of a stationary burnisher.

What I claim as my invention, and desire to secure by Letters Patent, is—

1. A burnishing-machine, by which a surface is given to the article to be burnished by feeding it under pressure over a stationary burnishing-tool, as specified.

2. The combination of a stationary burnishing-tool and friction feed-roll, substantially as specified.

3. The combination of the feed-roll and burnishing-tool with the pressure-screw, substantially as set forth.

E. R. WESTON.

Witnesses:
WM. FRANKLIN SEAVEY,
JOHN Y. RICKER.